(No Model.) 4 Sheets—Sheet 2.
A. M. TRUDE & C. H. COOLEY.
SIGNAL.
No. 354,816. Patented Dec. 21, 1886.
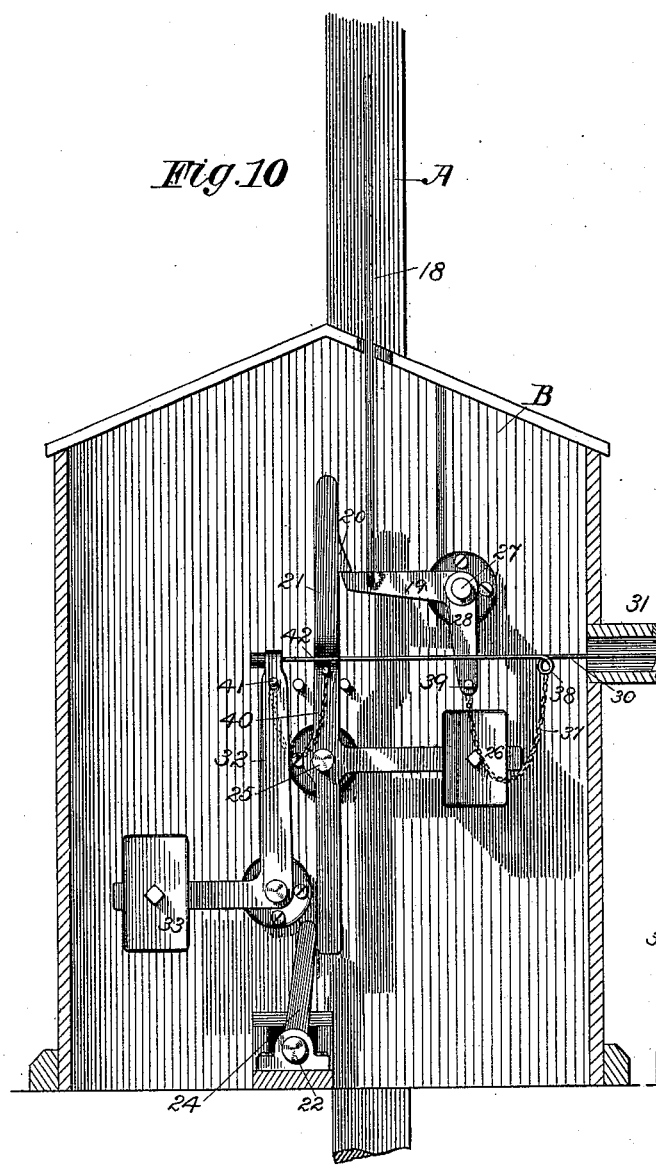
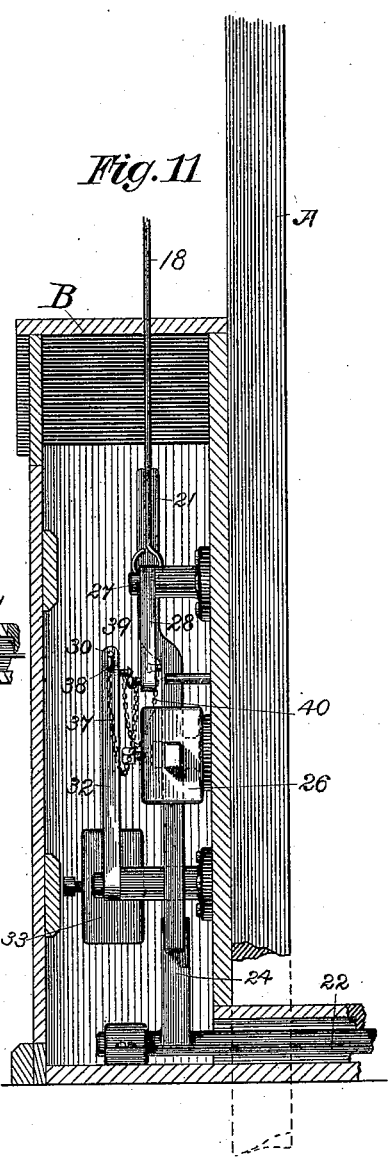
Witnesses:
Frank H. Pierpont
C. E. Buckland
Inventors:
Arthur M. Trude,
Chas. H. Cooley,
By F. H. Richards,
their Attorney.

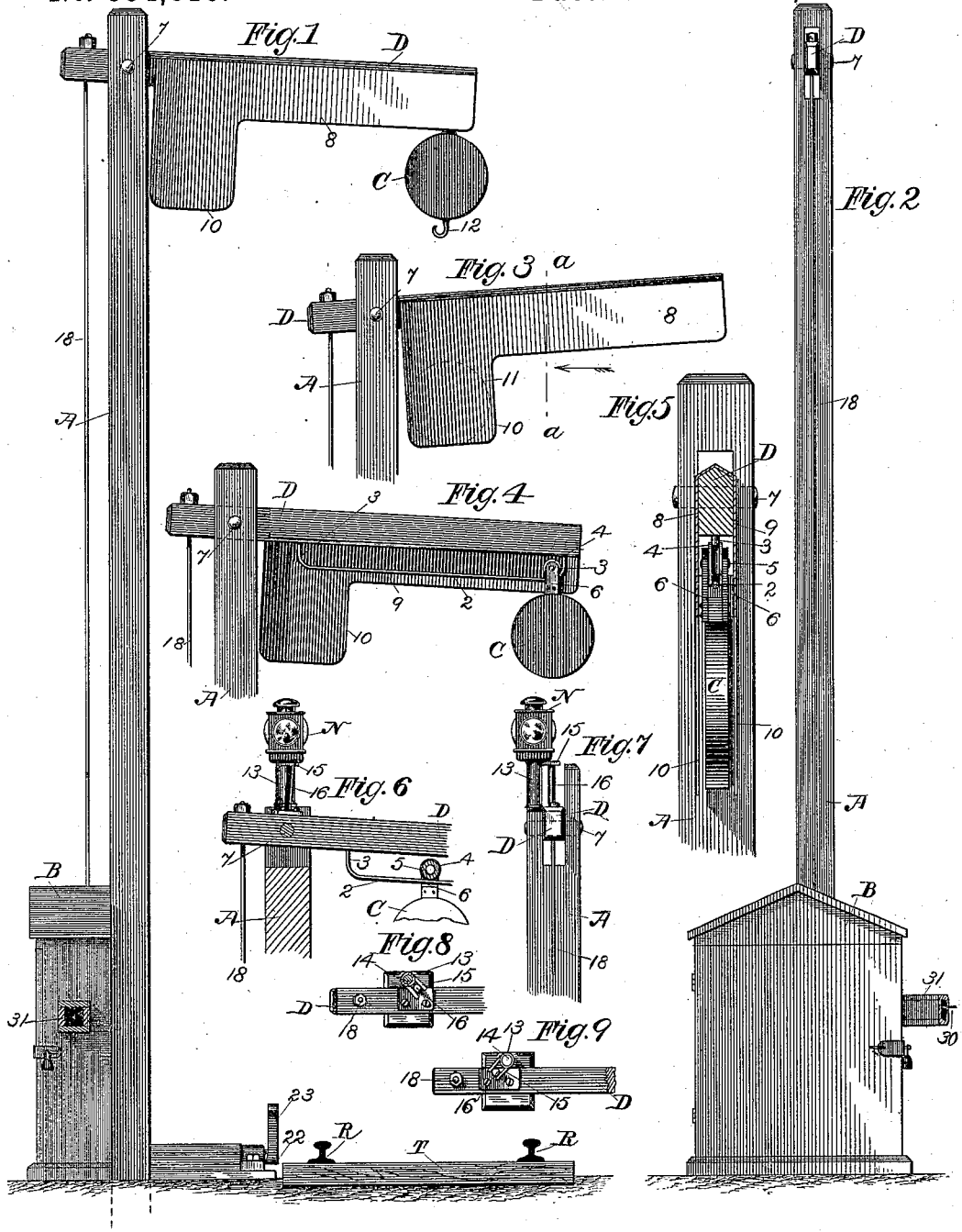

(No Model.) 4 Sheets—Sheet 3.
A. M. TRUDE & C. H. COOLEY.
SIGNAL.
No. 354,816. Patented Dec. 21, 1886.
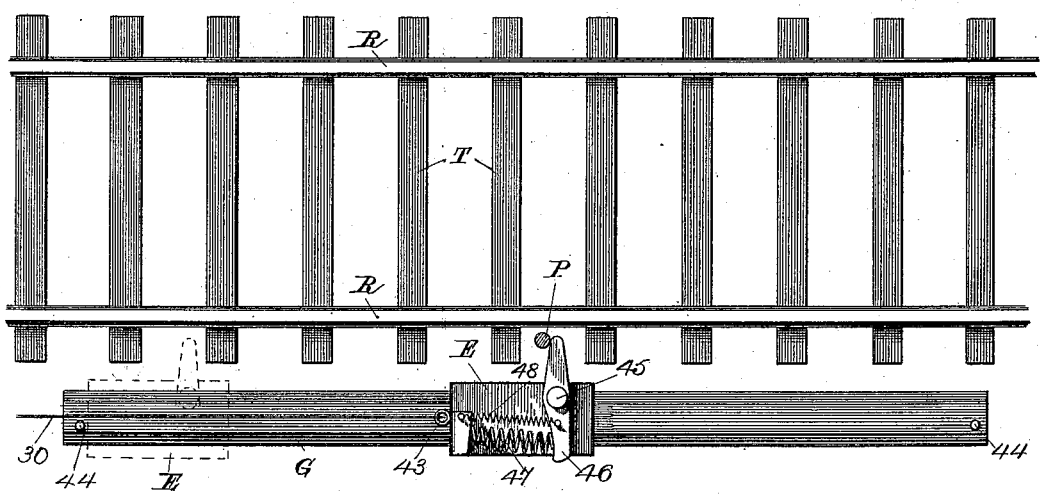
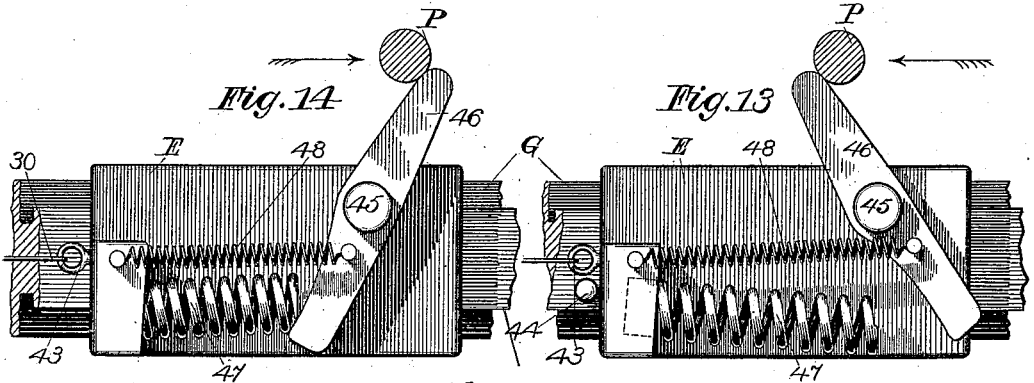
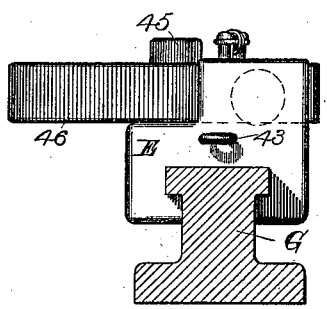
Witnesses:
Frank H. Pierpont
C. E. Buckland
Inventors:
Arthur M. Trude,
Chas. H. Cooley.
By their Attorney, F. H. Richards (No Model.) 4 Sheets—Sheet 4.

A. M. TRUDE & C. H. COOLEY.
SIGNAL.

No. 354,816. Patented Dec. 21, 1886.

Witnesses
Frank H. Pierpont
C. E. Buckland

Inventors:
Arthur M. Trude,
Chas. H. Cooley.
By their Attorney, F. H. Richards.

UNITED STATES PATENT OFFICE.

ARTHUR M. TRUDE AND CHARLES H. COOLEY, OF HARTFORD, CONN.

SIGNAL.

SPECIFICATION forming part of Letters Patent No. 354,816, dated December 21, 1886.

Application filed January 21, 1886. Serial No. 189,292. (No model.)

*To all whom it may concern:*

Be it known that we, ARTHUR M. TRUDE and CHARLES H. COOLEY, citizens of the United States, residing at Hartford, in the county of Hartford, State of Connecticut, have invented certain new and useful Improvements in Signals, of which the following is a specification.

This invention relates to signals for use on railways, and especially in connection with the "block system" of running trains, the object being to furnish for this purpose a reliable signaling apparatus operated by direct application of power from trains passing along the railway without the use of electricity.

To this end the invention consists in the improvements and combinations hereinafter set forth.

Figure 16:
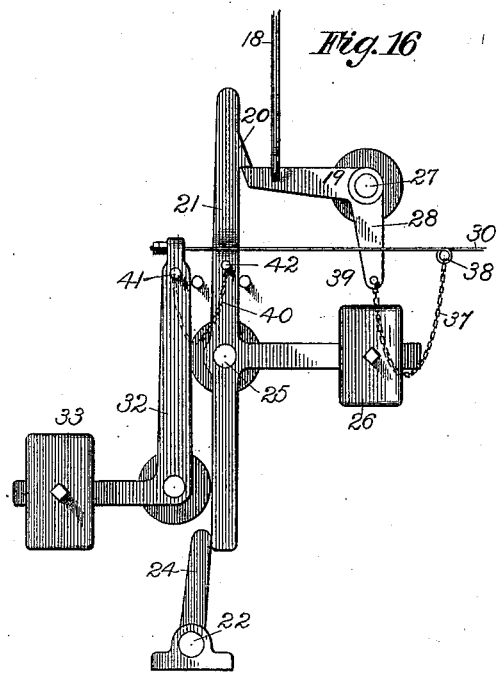
Figure 17:
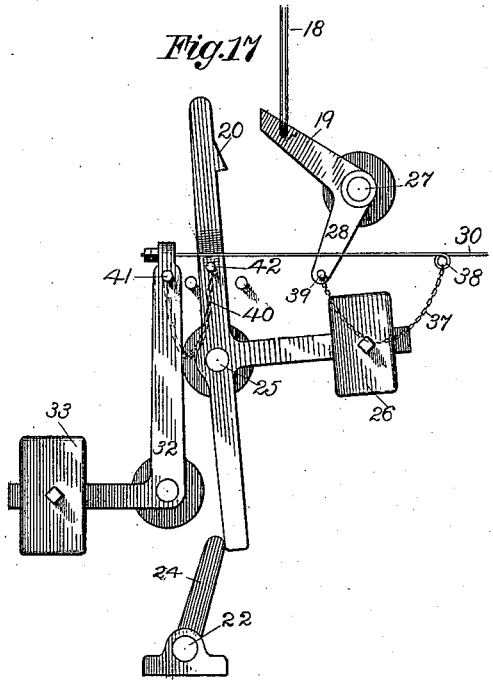
Figure 18:
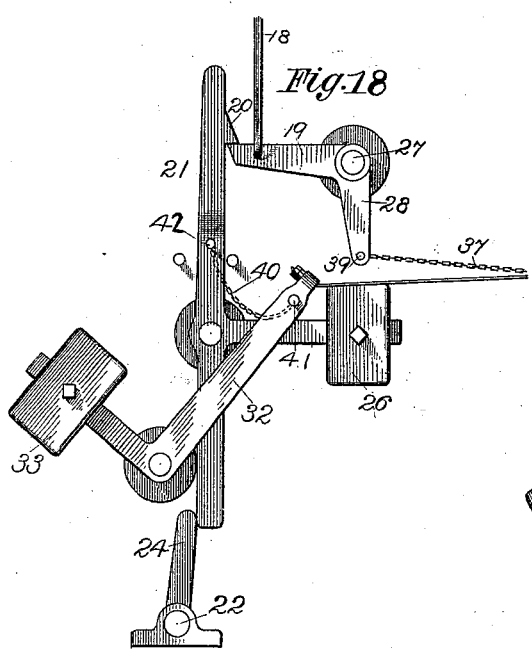
Figure 19:
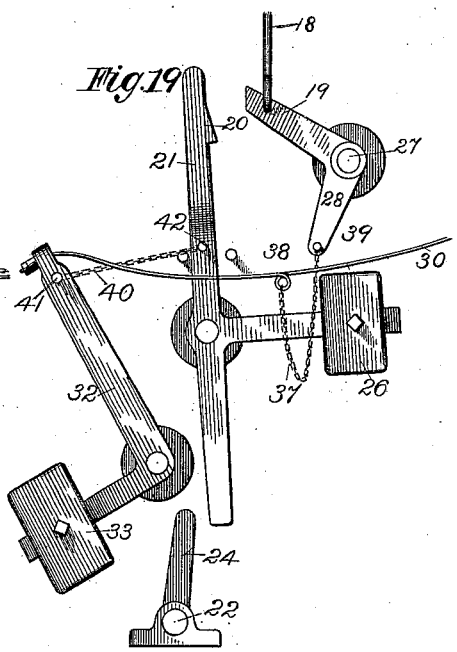

In the drawings accompanying and forming a part of this specification, Figure 1 is an elevation, as seen in the direction of the railway-track, of a signaling apparatus embodying our invention. Fig. 2 is an elevation of the same as seen in a direction crosswise to said track. Fig. 3 shows the signal proper set in the "clear" position, the signal-disk being housed. Fig. 4 shows the same set at "danger," the signal-disk being run out in sight. Fig. 5 is a view, partially in section, in line $a$ $a$, Fig. 3. Figs. 6 and 7 are side and end views in projection, showing the application to the apparatus of a revolving lantern operated thereby. Figs. 8 and 9 are two top views in different positions of the mechanism operating the same. Fig. 10 is an enlarged side view of the locking (and tripping) mechanism. Fig. 11 is a similar end view of this mechanism. Fig. 12 is a plan view of a section of track and the parts directly operated by the locomotive. Figs. 13 and 14 are two enlarged top views of the slide, illustrating the operation of its details under different conditions. Fig. 15 is an end view of the same. Fig. 16 shows in side view the locking mechanism set to hold the signal in the "clear" position. Fig. 17 shows the same operated by a train entering the "block" to set the signal at "danger." Fig. 18 shows the same operated by a distant train, leaving the block to set the signal at "clear" again. Fig. 19 shows the apparatus after the breaking of the actuating-wire, which event sets and leaves the signal at "danger."

Similar characters designate like parts in all the figures.

Our improved signaling apparatus is represented in the drawings as being set up beside a railway-track, whose rails and cross-ties are shown in Figs. 1 and 12, and designated, respectively, by R and T. At one side of this track there is firmly set into the ground an ordinary post, A, carrying at its top the signal and having at its base the housing B of the signal-operating mechanism, which we ordinarily designate as the "locking" mechanism.

The signal proper consists in any suitable body, as C, which may be either colored or lighted, or both, and is suspended from a track, as 2, Figs. 4, 5, and 6, that is constructed and arranged to be inclined in opposite directions successively for the purpose of causing the signal to travel thereon first in one and then in the opposite direction. This operation of the signal-track and signal is effected by means of a tilting beam, D, to which said track 2 is affixed. Said track may be constructed in various forms; but that shown is believed to be the cheapest and on the whole most satisfactory, being a round metal rod whose ends 3 are turned up for securing it to the beam and to form stops limiting the travel of the signal.

In order that it shall readily move along on its track and require for its proper operation but a slight inclination of said track, the signal C is in practice provided at its upper end with an anti-friction roller, 4, of any construction suitable for running on said track. As shown in the drawings, said roller turns on a pivot-pin, 5, which is supported in plates 6, affixed to the sides of the signal-disk C; but other well-known devices are proper substitutes for such purpose, and we do not limit our invention to the use of precisely the devices shown for this or other minor details. The beam-carrying track 2 is, for the purpose of inclining said track as required, constructed and arranged to be tilted in some convenient manner, preferably on a pivot, 7, fixed in or to post A. Said beam is provided with side guards, 8 9, protecting the signal-track and roller from rain or snow, which guards each have an extension, 10, forming a housing for the signal-disk when this is run back, as shown by dotted line 11, Fig. 3. The side guards may, however, be dispensed with, and also the signal-housing 10 may be attached directly to post A if for any reason such obvious modifications are deemed preferable; and wherever it shall be convenient or desirable to do so the signal may be supported on a building or other structure as a substitute for said post.

The disk C, as shown in the several figures, is supposed to represent not only a colored disk for use as a signal by day, but it may be also a lantern having a colored light for use by night.

The lantern may, it is obvious, be suspended from a hook, as 12, Fig. 1, on the signal-disk, the housing 10 being then made large enough to cover both. Instead, however, of a lantern suspended as described, we prefer to use for a night-signal an ordinary revolving lantern, N, Figs. 6 and 7, having the usual arrangement of white and red glasses. The stem 13 of this lantern is hollow, and fits loosely over a fixed stud, 14, attached to post A. Said stem is provided with arms 15, between which works the upper end of an arm or lever, 16, that is rigidly attached to beam D. By means of this simple and well-known apparatus, or some modification thereof, the tilting of the beam in either direction revolves the lantern correspondingly, the mechanism being in one position in Figs. 6 and 8 and in the opposite position in Fig. 9. It will be understood that bevel or other suitable gearing may be substituted for the arms 15 and 16, above described, as an equivalent thereof.

For operating the beam, and through this the signal, a rod, 18, is connected to said beam and carried down to a locking mechanism contained, preferably, in the locked housing B, protecting it from the weather and from meddlers. In Figs. 3, 10, and 11 the signal and said mechanism are respectively in their locked positions, indicating to an approaching train that the track ahead is clear. It will be noticed that rod 18 is connected at its lower end to an arm, 19, (see Fig. 10,) which in this case is locked down by a catch, 20, formed on lever 21. The signal is thus locked at "clear," rather than in its opposite position, so that in case connection 18 should be broken by accident or otherwise the signal would by its own weight be set at "danger." The signal standing at "clear," it is unlocked or tripped by a tripping mechanism operated by a train on its arrival at the signal-housing. This mechanism is or may be substantially the same as now commonly employed for operating or tripping the old kinds of signals, it comprising merely a part to be struck by the passing engine or train, a transmitting shaft or rod, and a part acting directly to unhook the catch. In the drawings such a shaft, designated by 22 and supported in any suitable bearings, is provided at one end with an arm, 23, adapted to be struck by a projecting part of the train running on rails R, and at the other end (within housing B) it has an arm, 24, acting against a part of lever 21 to swing this lever on stud 25, thus unhooking arm 19 and setting the signal at "danger," as before stated. When said train is entering the "block," lever 21 is normally held against arm 19 by a weight, as 26, or, if preferred, by a spring. (Not shown.) Arm 19 is pivoted on stud 27, and has a downwardly-projecting end, 28, whereby it is operated for locking the signal in the "clear" position from a wire, 30, running to a distant point alongside the railway-track. This wire, which may be carried along for protection in the usual box, 31, may be connected directly to arm 28; but we prefer another arrangement, as follows: Said wire 30 is carried past arm 28, and is connected to a weight, or, as shown and preferably, to a weighted lever, as 32, having weight 33, normally tending to keep said wire in a state of tension.

The wire 30 is to be connected to arm 28 in some manner, allowing it to have a limited amount of motion before it moves said arm. Of the several well-known devices for effecting such a connection of said parts, we have selected for illustration in the drawings the short and normally-slack chain 37, which is attached to the wire at 38 and to the arm at 39. Arm 32 is to be similarly connected to lever 21, and another chain, 40, is shown for that purpose attached (see Fig. 10) at 41 to the arm and at 42 to the lever. This arrangement of the several connections is adopted, rather than a simple attachment of wire 30 to arm 28, in order to render the apparatus self-tripping in case of breakage of said wire, as hereinafter explained.

As above stated, wire 30 extends along the railway to a distant point. In Fig. 12, representing such a place, there is seen the farther end of the wire 30 and a preferred apparatus for operating it in one direction—that is, to set and lock the signal in the "clear" position. Said apparatus comprises, as essential parts thereof, a guide, a carriage running on said guide, and to which the wire is secured, and a latch on the carriage, whereby this may be slid along on said guide by a train passing in one direction on the rails R. In Figs. 12 to 15, G designates one suitable form of said guide laid alongside the railway and near to one side thereof. Fitting over flanges on the guide any suitable carriage, E, is adapted to slide freely Wire 30 being connected to one end thereof, as at 43, stops 44, one at either end of the guide, Fig. 12, are provided to prevent the carriage sliding off the same. Said carriage has pivoted thereto, at 45, a latch or lever, 46, and is provided with a stout push-spring, 47, and with a weaker pull-spring, 48, connected to the latch and normally holding this against the push-spring, as in Fig. 12. One end of said latch, which end projects over the carriage toward the railway-track, is adapted to be struck by some projecting part, as P, arranged therefor, of a locomotive or car passing along on rails R. In going in the wrong direction—that is, toward the signal—said part P acts on the latch from the right hand, as in Fig. 1, to merely turn it on the pivot 45 without moving the carriage, unless this is effected incidentally through spring 48, which, however, would be a harmless circumstance, as it could only travel to its normal position, (shown by dotted lines in Fig. 12,) wherein it is normally held by the weighted lever 32, above described.

In going in the right direction—that is, away from the signal—the part P strikes the latch on the left-hand side, as in Fig. 12, and, owing to the resistance of spring 47, draws the carriage along toward the right hand until wire 30, being drawn taut, arrests the further movement of said carriage. Then spring 47 yields, as in Fig. 14, allowing the latch to turn and part P to slip by. This allows the carriage to be returned to its normal position by the weighted lever 32, as above specified.

The operation of our improved signal and signaling apparatus, and especially the operation of the details thereof, will be understood from the preceding description.

The signal proper being set at "clear," as in Fig. 3, and the locking mechanism standing, as in Figs. 10 and 16, a passing train strikes the tripping apparatus and forces back lever 21, as in Fig. 17. This allows the beam D to fall and sets the signal at "danger," the arm 19 being thereby drawn up and remaining, together with other details, as in said Fig. 17. On arriving at the other end of the block—say, from one-fourth to two miles away—the train pushes along carriage E, as above described, and pulls out wire 30 until this takes up the slack of chain 37 and draws down arm 19 under catch 20, thereby raising and locking beam C and the signal again in the "clear" position. At the same time said wire pulls on arm 32, drawing it over, as in Fig. 18, until it, being nearly in line with that end part of the wire, acts as a stop for limiting the movement of carriage E. The signal being locked, lever 32 draws back the wire and carriage to their respective normal positions. If, now, during any of these operations the wire line 30 shall be broken or detached, it will become slack, as in Fig. 19, and allow the weighted lever 32 to take up the slack in chain 40 and draw back lever 21, thereby unlocking arm 19 and setting the signal at "danger," as before. It will be understood that for said parts to operate thus weight 33 must be much heavier than weight 26, or be placed on a correspondingly longer arm; also, that the entire apparatus is capable of much modification of proportions without departing in anywise from the spirit of our invention.

It should be understood that, instead of the mechanism shown in Figs. 12 to 15 for operating the wire line, we may use a rock-shaft and arms, such substantially as herein described, for tripping-lever 21, one arm, corresponding to 23, being operated by the train, the other arm, corresponding to 24, being connected to the distant end of the line. The apparatus we have illustrated, however, may be more readily constructed to have a long stroke, so as to fully take up the slack of the line and thus operate the locking mechanism. The carriage E, instead of sliding on the guide, may be fitted with anti-friction rollers to facilitate its operation.

Having now described our invention and in what manner it may be carried into effect, what we claim to be new, and therefore desire to secure by Letters Patent, is—

1. The combination, in a signaling apparatus, of a supporting-post or frame-work, a tilting beam supported thereon, a traveling signal suspended from a track fixed to said beam, a revolving signal supported on said post or frame-work, and connections operating said revolving signal from said beam correspondingly with the operation of the signal on the track, substantially as described.

2. The combination, in a signaling apparatus, of a swinging arm connected to the signal, a wire line operated from a distant point, a slack connection between said wire and said arm, a catch normally bearing against said arm, a weighted lever directly connected to the wire line, and a slack connection between the weighted lever and the catch, substantially as described.

3. The combination of guide G, carriage E, connected to line 30, latch 46, pivoted to said carriage, spring 47, and spring 48, substantially as described.

In testimony whereof we hereunto sign our names, at Hartford, aforesaid.

ARTHUR M. TRUDE.
CHARLES H. COOLEY.

Witnesses:
GEO. W. DRAKE,
FRANK HARRINGTON.